Oct. 5, 1954 J. THOMPSON ET AL 2,690,572
APPARATUS FOR HANDLING AND TREATING ELONGATED WORKPIECES
Filed March 27, 1947 8 Sheets-Sheet 1
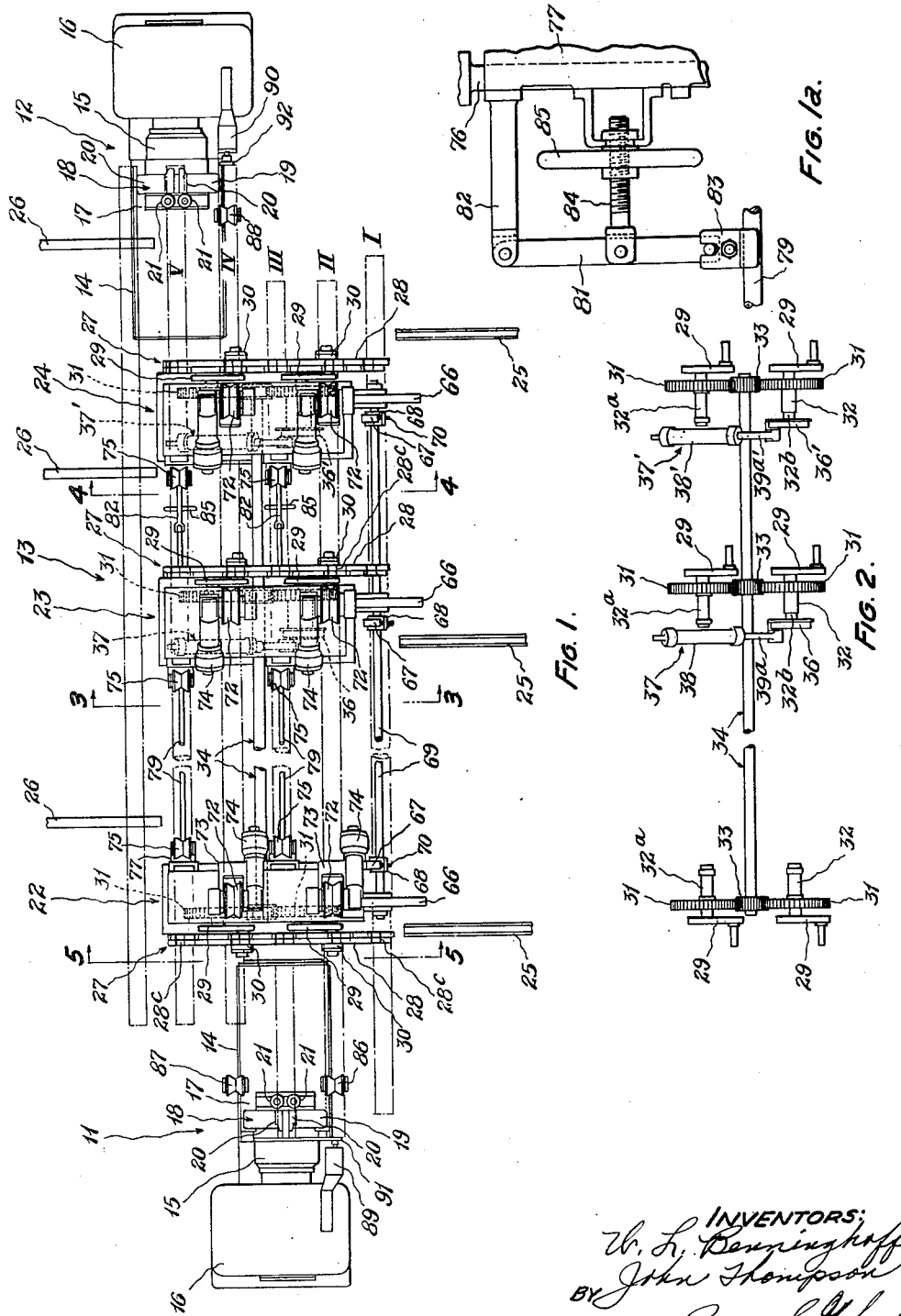

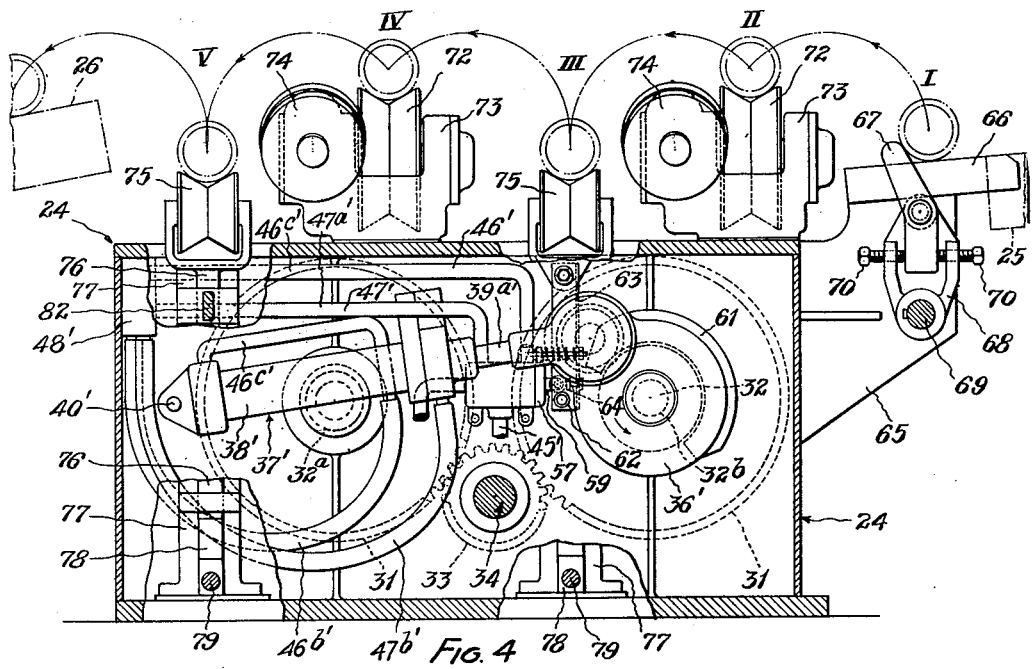

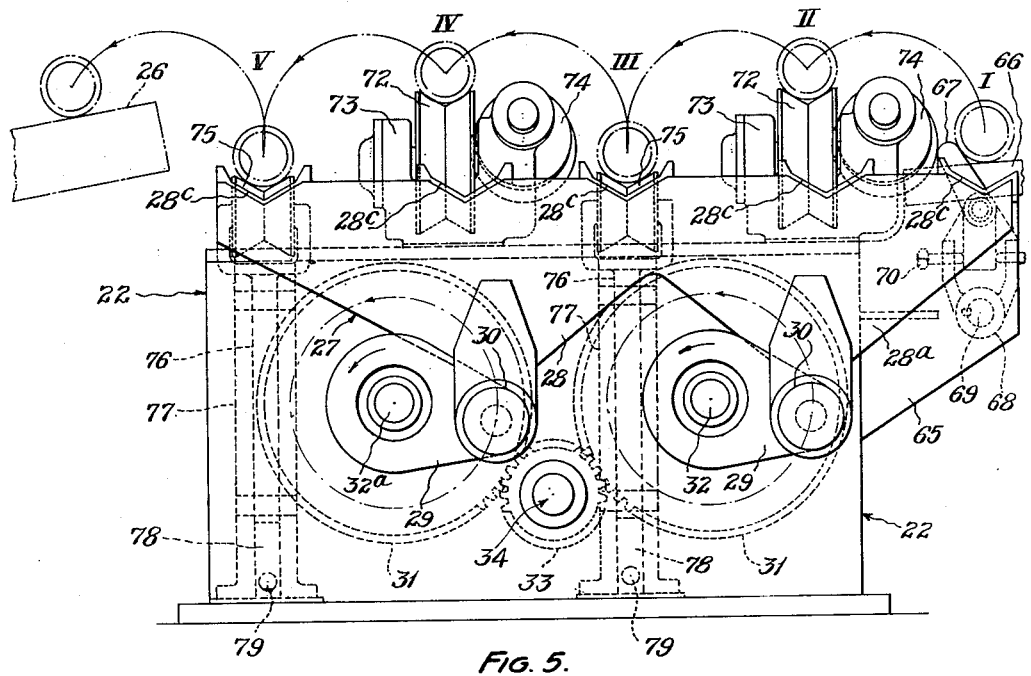
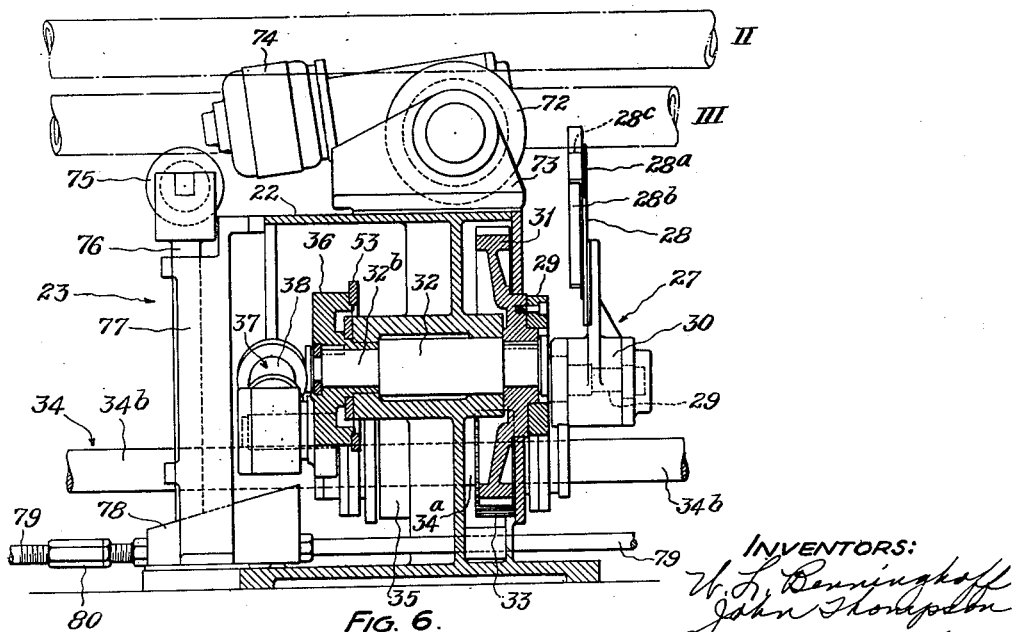

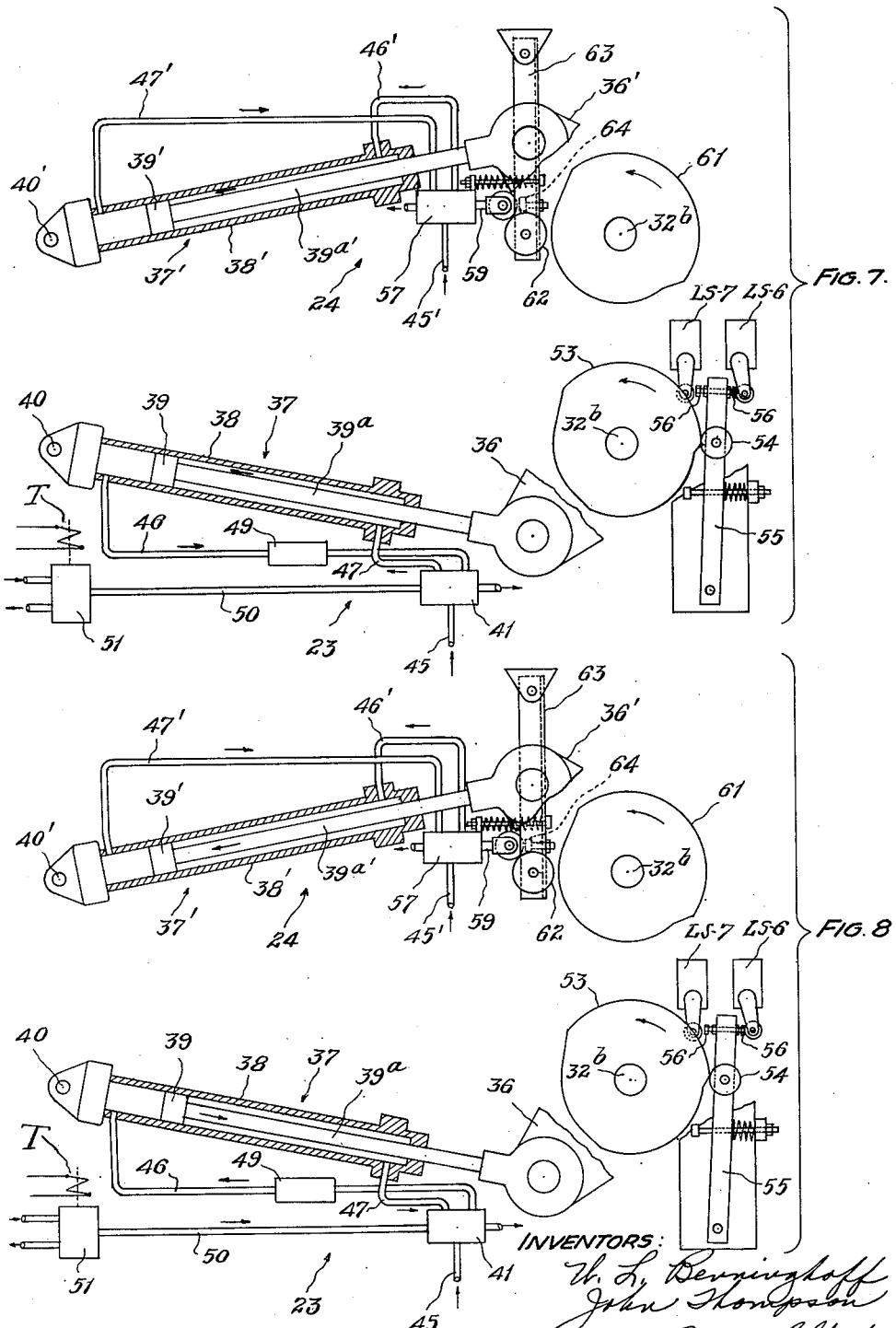

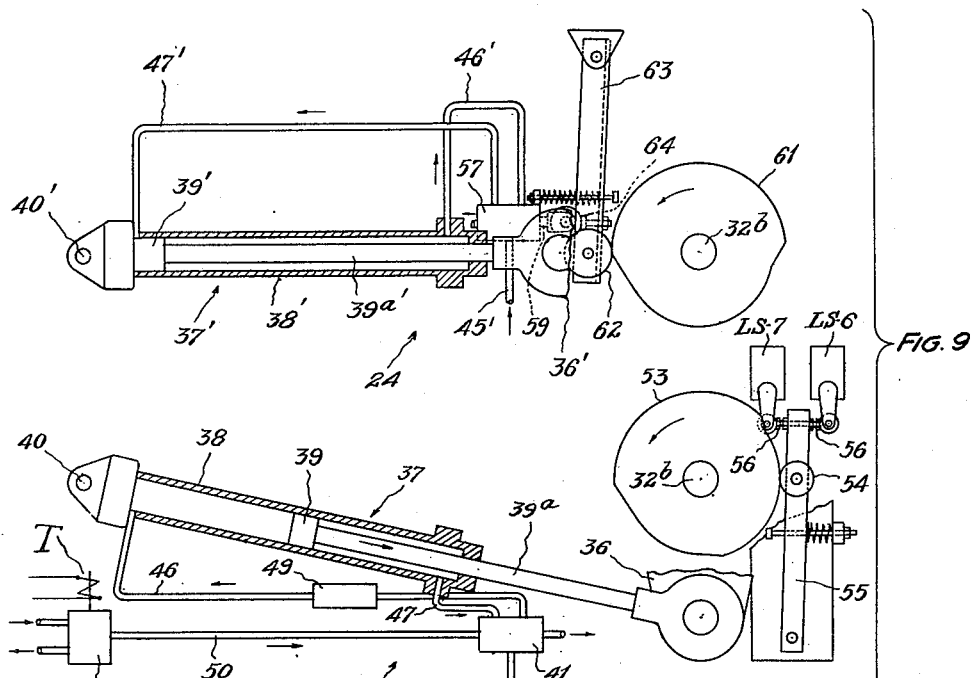
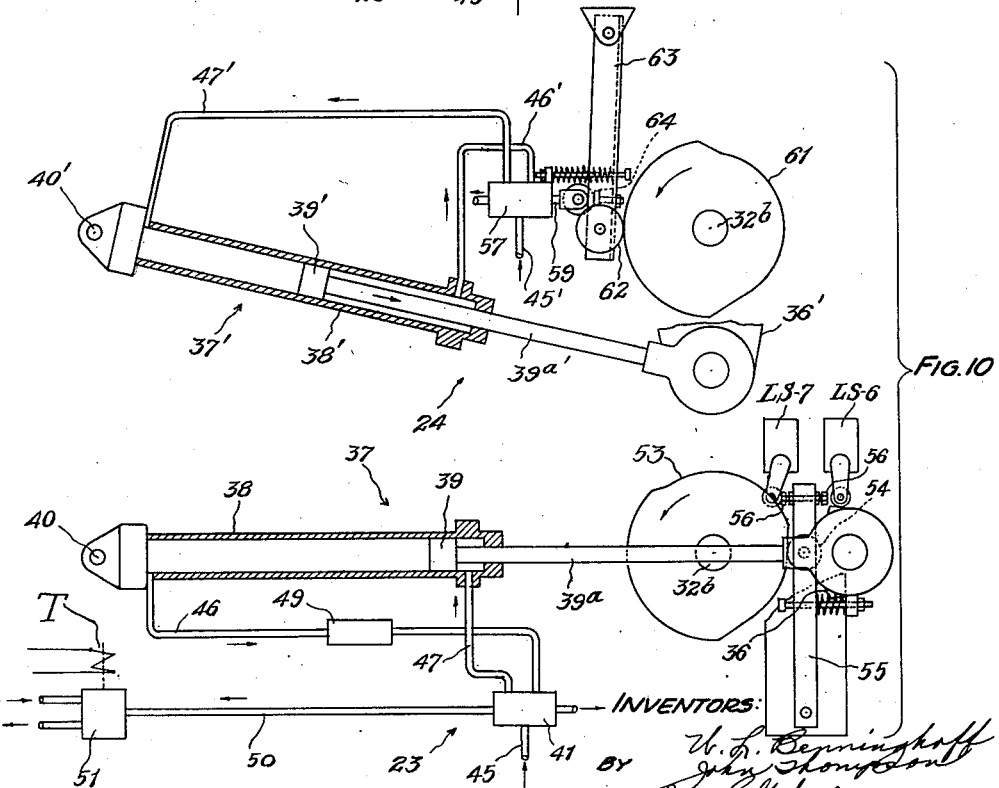

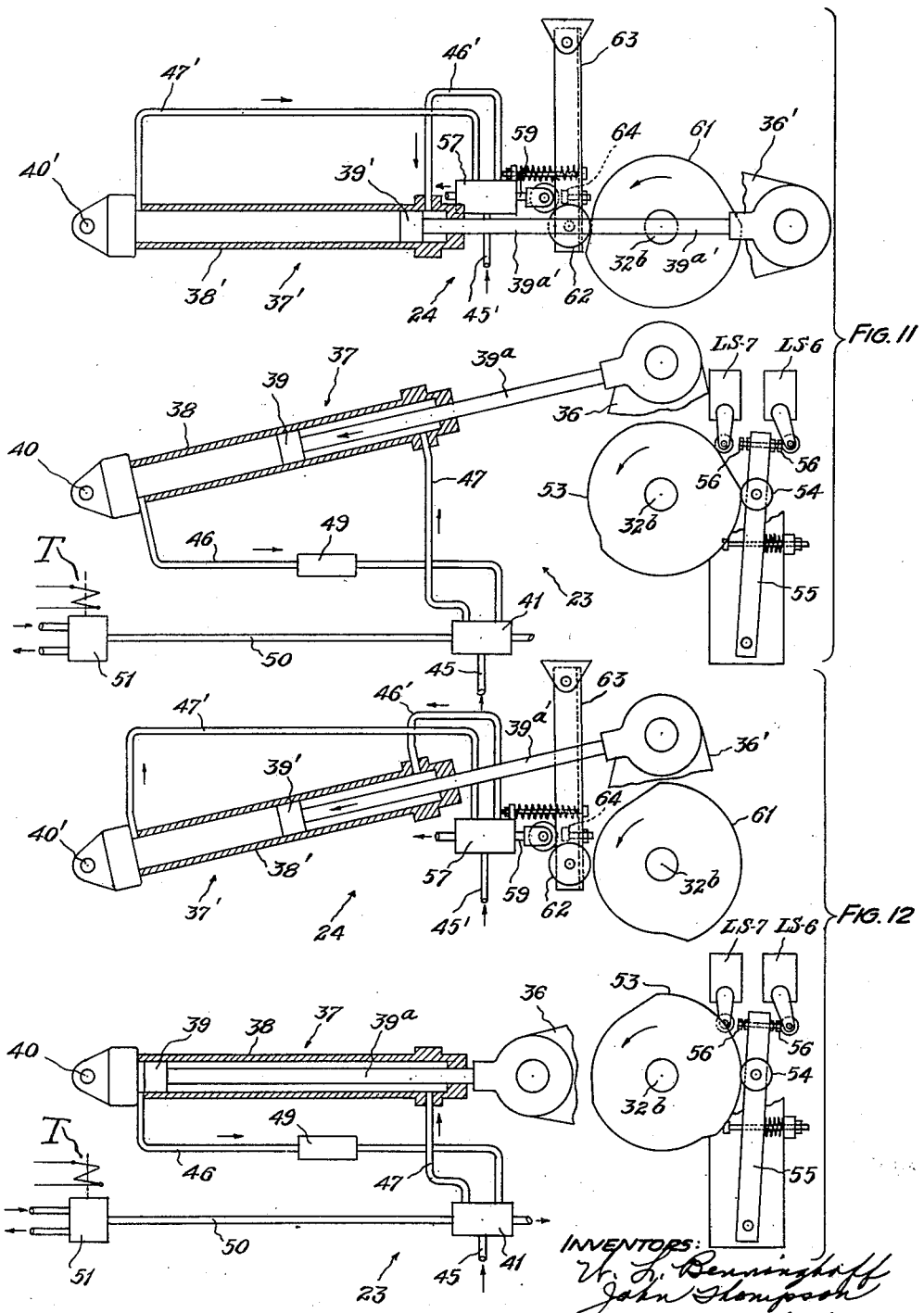

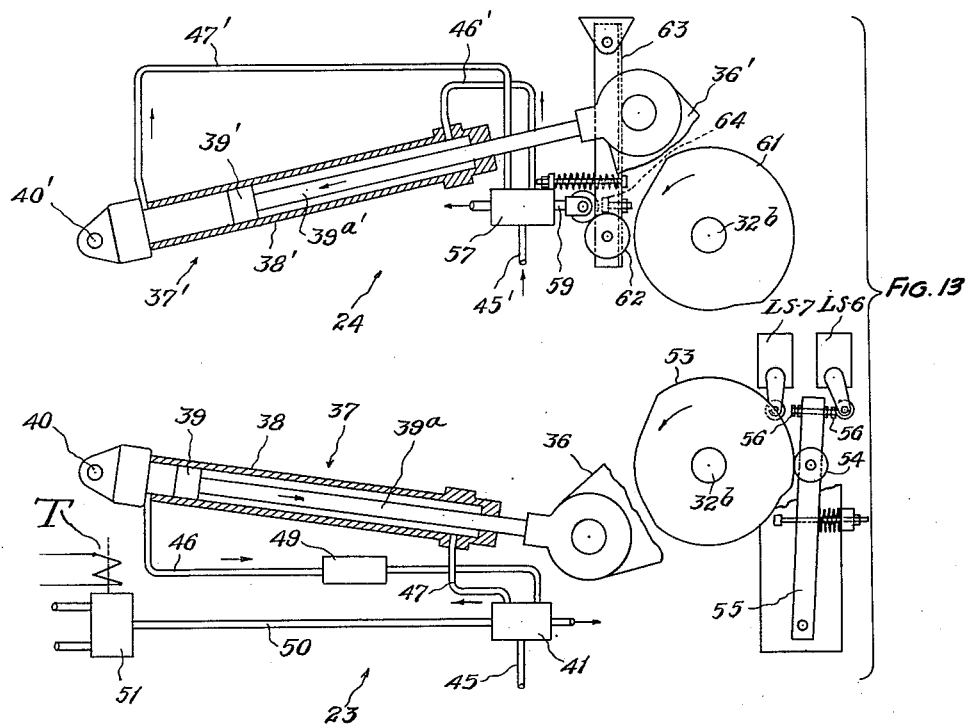
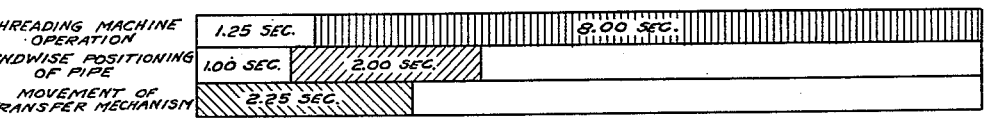
FIG. 17.
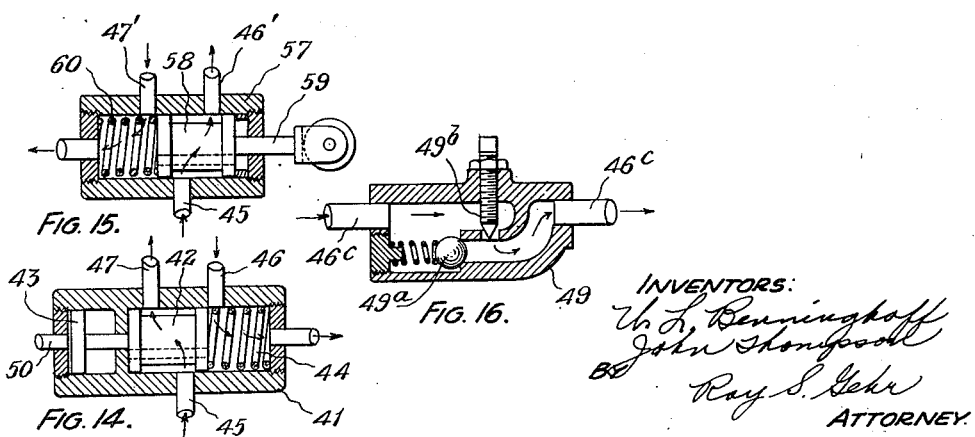

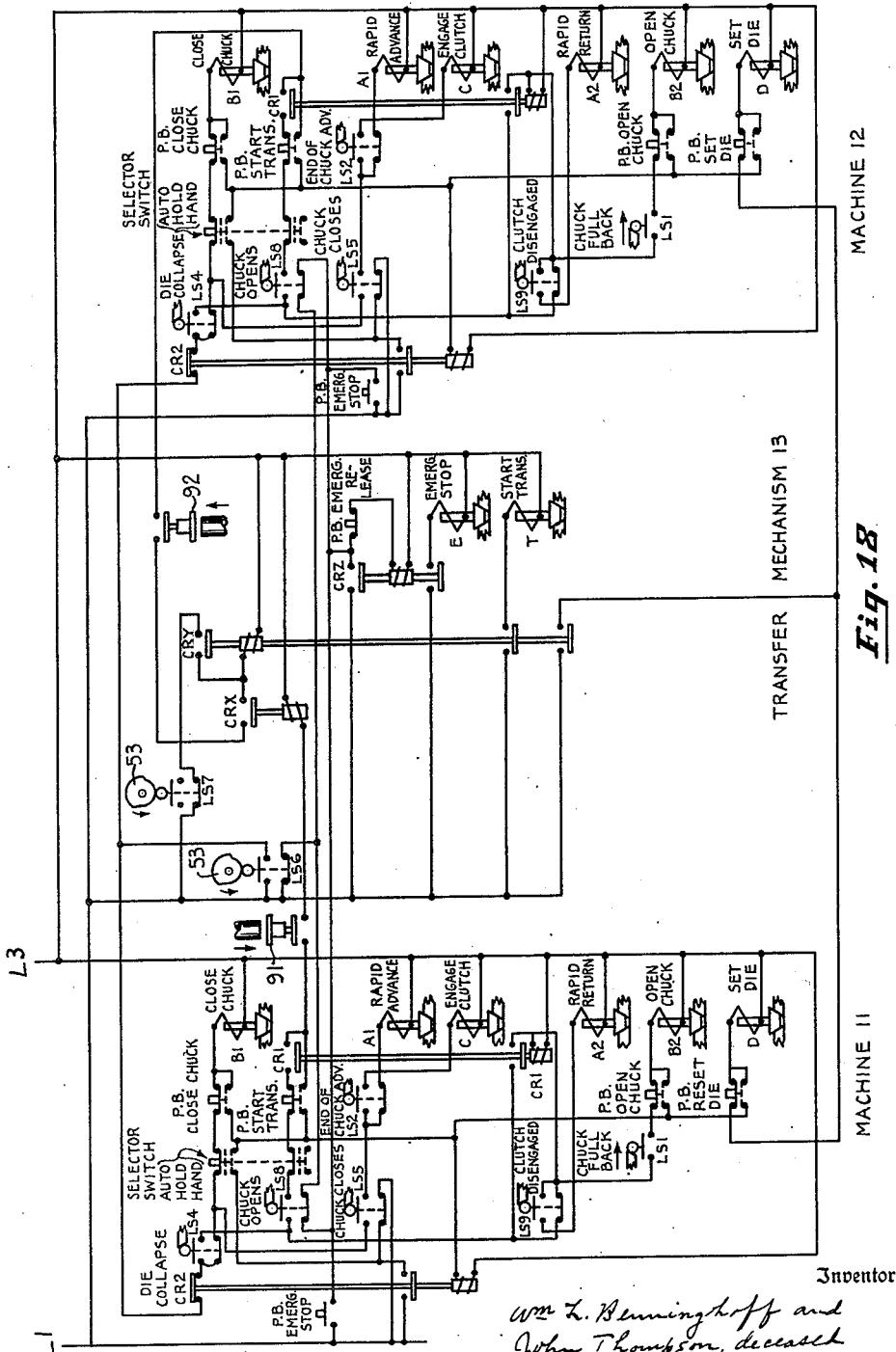

UNITED STATES PATENT OFFICE 2,690,572

APPARATUS FOR HANDLING AND TREATING ELONGATED WORKPIECES

John Thompson, Van Nuys, Calif., and William L. Benninghoff, Waite Hill Village, Ohio; Nora Thompson, administratrix of said John Thompson, deceased, assignors to The Pipe Machinery Company, Cleveland, Ohio, a corporation of Ohio Application March 27, 1947, Serial No. 737,500

15 Claims. (Cl. 10—107)

The invention relates to apparatus for feeding work pieces to machine tools and other kinds of work-treating apparatus and for discharging the work pieces following their treatment. The improvements are more particularly applicable to elongated work pieces such as pipe and rod sections and various types of work thereon such, for example, as the machining of such sections. Accordingly, for purposes of explanation the invention will be shown and described as used in connection with machine tools for machining and threading the ends of pipe sections.

The general object of the invention is to provide improved handling apparatus adapted automatically to feed work pieces to the treating machine or machines and discharge them therefrom so that when used in conjunction with machining apparatus which is itself automatic, the entire handling and treatment of the work pieces may be carried out with a minimum of supervision and a maximum of dispatch.

More particularly the invention has for one of its objects to provide improved handling apparatus adapted to receive work pieces presented to it in somewhat random manner and position them with a high degree of accuracy to be operated upon the machine served.

Another object of the invention is to provide work-handling or transfer apparatus adapted, when operated in conjunction with a machine tool or other treating apparatus, to perform its functions in such manner that the working cycle of the entire apparatus is of minimum length with resultant high work capacity in terms of pieces treated per hour.

Another object of the invention is to provide automatic apparatus for performing operations simultaneously upon a plurality of work pieces, including operations upon the two ends of such work pieces, such apparatus comprising a plurality of operating machines and associated work handling and transferring mechanism constructed and arranged for simultaneous and synchronous functioning of the operating machines and characterized by precise and rapid handling of the work pieces so that the entire apparatus operates efficiently as a unit.

A further object of the invention is to provide apparatus for the purposes specified which is relatively quiet in operation and free from serious shock and vibration, with resulting minimizing of wear and failure of parts.

Another object of the invention is to provide improved fluid driven intermittent movement mechanism of relatively simple construction susceptible of automatic control and well adapted to actuate the work handling mechanism smoothly and without shock.

Still another object of the invention is to provide apparatus of the specified kind having improved control devices both for automatic operation of the apparatus and for manual control of the apparatus, either in part or as a whole, under special conditions.

With the above noted and other more or less incidental or ancillary objects in view, the invention consists in certain forms, combinations and arrangements of parts which will be explained in connection with the exemplary embodiment of the invention shown in the accompanying drawings and particularly pointed out in the claims.

Preliminarily it may here be noted that the invention contemplates apparatus comprising means for holding work pieces while they are being treated or worked upon, means for effecting the treatment of the work pieces and workhandling means for transferring the work pieces from a receiving point or station to other stations or positions, including those of the holding means and the point of delivery. When both ends of elongated work pieces are to be subjected to treatment simultaneously at least two treating units or machines are required and the transfer mechanism is constructed to move the work pieces, after treatment of one end thereof, to holding means cooperating with the other treating unit, and thence to a point of final delivery. The contemplated apparatus further comprises control means of a novel character which under normal conditions causes the entire apparatus to operate automatically as a unit and without manual intervention at any stage of the operation. The means for holding the work pieces during their treatment may be a separate unit or, as in the case of pipe threading operations, may be a part of the threading machine. In the latter case the holding means may be mounted on a traverse table to be advanced and retracted in relation to the fixed threading means or the holding means may be fixed and the threading means movable toward and away from it.

In the drawings,

Fig. 1 is a plan view of pipe threading apparatus embodying the invention.

Fig. 1a is a side elevation on an enlarged scale of a manual adjusting device constituting a part of the work handling apparatus.

Fig. 2 is a plan view of some of the main parts of the hydraulically driven work transfer apparatus, the said parts being shown detached from the remainder of the apparatus for clarity of disclosure.

Figs 3 and 4 are enlarged vertical sections on the lines 3—3 and 4—4 of Fig. 1.

Fig. 5 is an enlarged elevation of the end of the work transfer mechanism adjacent line 5—5 of Fig. 1.

Fig. 6 is a fragmentary sectional view on broken line 6—6 of Fig. 3.

Figs. 7 to 13, inclusive, are diagrammatic views showing the operational sequence of the multiple cylinder hydraulic drive motor of the work transfer mechanism.

Fig. 14 is a longitudinal sectional view of the fluid operated control valve of one of the cylinders of the hydraulic motor of the work transfer mechanism.

Fig. 15 is a longitudinal sectional view of the cam operated control valve of a second cylinder of the motor.

Fig. 16 is a longitudinal sectional view of a one-way restrictor valve constituting a part of the hydraulic motor means of the transfer mechanism.

Fig. 17 is a diagram illustrating time characteristics of the working cycle of the work handling and threading apparatus.

Fig. 18 shows a wiring diagram of the control devices of the entire apparatus.

As has been indicated, the particular form of work-handling apparatus shown in the drawings is designed for use in threading the ends of pipe sections, or in end-facing such sections preliminary to threading them. For such threading and facing operations machines are available that operate automatically on pipe sections manually fed to them and manually discharged. In order to make such work wholly automatic the present improved work-handling mechanism is combined with the threading machine or machines and the controls of the work-handling mechanism are integrated with those of the threading machines to form a unitary system.

Referring in detail to the apparatus illustrated in the drawings, especially Figs. 1 to 6, there are shown at 11 and 12 two die threading machines of the character last referred to together with work-handling or transfer apparatus designated as an entirety by the number 13 and suitably disposed between machines 11 and 12 for their mutual cooperation.

*The threading machines*

As the present invention is not concerned with improvements in the construction of threading machines themselves a brief general description of one of the machines shown in the drawings (and which is available on the market) will suffice for the purposes of the present disclosure. For a complete detailed disclosure of such a threading machine reference may be made to the application for United States patent of W. L. Benninghoff and A. F. Robertson, Serial No. 579,752, filed February 26, 1946.

The machine 11 comprises a bed or frame 14, a threading die 15 rotatably mounted on the bed, the die being of the collapsible chaser type. An electric motor (not shown) serves to rotate the die through suitable gearing enclosed by protective casing 16. A traverse table 17 is slidably mounted on bed 14 and carries a power actuated chuck designated as an entirety by 18. Alternatively (in accordance with prior practice), the rotary die 15 may have a slidable mounting on the frame 14 to be traversed relative to chuck 18. The chuck comprises a frame structure 19 which is open centrally at the top to expose a pair of gripper jaws 20, 20 which are adapted to grip a pipe section when they are moved toward each other and to release it when they are retracted. The chuck is fitted with work guiding and supporting means in the form of frustro-conical rolls 21, 21 which are adjustable toward and from each other to accommodate pipe sections of different diameters. With a chuck of such construction a pipe section can readily be lowered into the chuck and lifted from it when its jaws are retracted. A chuck mechanism of this character is shown in U. S. patent to Benninghoff, No. 2,067,626, as well as in the above noted application. In addition to the above mentioned electric motor, which drives the die spindle and also effects forward feed of the traverse table 17, various fluid motor means (not shown) are provided to close and open the chuck jaws, effect rapid traverse of the traverse table, engage and disengage the drive clutch of the die and reset the chasers following their collapse at the end of the threading operation. The fluid motors are, of course, provided with suitable valves to control admission and exhaust of the working fluids, the valves preferably being solenoid operated.

In the operation of such threading machines as previously used with manual feed of the work pieces, the sequence of movements of the motor driven parts is initiated by the manual endwise movement of a pipe section to present its end to the chasers; while in carrying out the present invention the automatic sequence of the threading machine operation is similarly initiated but under the control of the work handling mechanism, as will later more fully appear.

As the threading machine 12 is the same in construction as machine 11 the same reference characters are applied to both and the above description may be taken as applicable to both machines.

*The work-handling mechanism*

The work handling or transfer mechanism comprises a plurality—usually three, four or five—of so-called "stands." The apparatus illustrated comprises three such stands designated generally by the numerals 22, 23 and 24. Each of the three stands includes upwardly exposed pipe-supporting means and transfer devices for effecting lateral movement of the pipes relative to the supporting means. The transfer devices of all three stands are interconnected and driven as a unit by hydraulic motor devices carried by stands 23 and 24. As appears from Fig. 1 the three stands are in mutual alignment and disposed in the space between the threading machines 11 and 12. On the receiving sides of the three stands are arranged elevated pipe skids 25, 25 on which the pipe sections to be threaded are presented to the transfer mechanism. On the discharge sides of the stands are arranged elevated delivery skids 26, 26 which receive the pipe sections from the transfer mechanism upon completion of the threading operations. Skids 25 and 26 are preferably inclined downward, the former toward and the latter away from the transfer stands (Figs. 3-5).

Each of the stands 22, 23 and 24 comprises a frame and casing structure on or in which are supported the pipe transfer means which are designated generally by the numeral 27 and which comprise in the case of each stand a lifting structure or carrier 28 and a pair of crank arms 29 (Fig. 5) which support and move the carrier, the carrier being fitted with depending bearings 30 mounted upon the pins of the crank arms (Figs. 5 and 6). Each carrier 28 comprises a plate 28a and stiffening angle strips 28b extending around the edges of the plate, the top edge of the carrier being formed with a series of five V-notches 28c. The crank arms 29 are fixedly attached to gear wheels 31, 31 which are keyed on shafts 32, 32a having bearing supports in the stand frame structure (Fig. 6), the assembled shafts (32, 32a), gears (31, 31), crank arms (29, 29) and their pins constituting pairs of cranks upon which the carriers (28, 28) are supported. The two gears 31, 31 are operatively connected by a pinion 33 and such pinions 33 of the three stands are mounted on and interconnected by a shaft structure 34 which comprises, in each stand, a shaft section 34a rotatably supported in bearings 35 and carrying the pinion 33. The shaft structure 34 further comprises and long shaft sections 34b which serve to operatively connect the three sections 34a.

The V-notches of the three carriers 28 are similarly spaced across the top edges of said carriers and, with corresponding notches of the several carriers in alignment (Fig. 1), provide three seats or points of support for each of five pipe sections.

With the transfer devices of the several stands operatively interconnected by the shaft means 34 the gear wheels 31, 31 of all of the stands may be caused to rotate in unison so that the three pairs of crank arms 29, 29 cause a movement of the carriers 28 such that each point in each carrier (for example, the point of each V-notch 28c) follows a circular path and the carrier is maintained in parallelism throughout its circular movement. Thus a pipe section supported in corresponding notches of the three carriers will move laterally in a circular arc with said carriers. The rotation of the gears 31, 31 is effected by hydraulic motor means in the form of two out-of-phase reciprocating piston motor units which are arranged to drive cranks which are disposed less than 180° apart and preferably 90° apart angularly, the cranks being interconnected to turn in unison. It is quite possible to arrange the arms of the two driven cranks on the same shaft but it is advantageous and preferable to mount them on two of the shafts 32 in separate stands 23 and 24, each with its hydraulic driving unit. Except for the valve control means of the two hydraulic motor units the motor drive units are alike and in the description which immediately follows reference numerals applied to motor parts of stand 23 will be applied, with prime marks added, to corresponding parts in stand 24.

In the case of stands 23 and 24 the shaft 32, as shown in Fig. 6, has an extension 32b on which is keyed crank arm 36 (or 36') which is connected to be driven by hydraulic motor unit 37 (or 37') comprising cylinder 38 (or 38'), a piston 39 (or 39') and piston rod 39a (or 39a'). Cylinders 38, 38' are each mounted at one end on a trunnion 40 (or 40') carried by the stand structure and the outer end of the piston rod is directly connected to the pin of crank arm 36 (or 36').

Working fluid is supplied to the two ends of cylinder 38 by means of a four-way valve device 41 comprising a spool valve member 42, actuating piston 43 and spring 44 (Fig. 14), such valves being well known. Liquid under pressure entering through conduit 45 will be directed, according to the position of spool 42, through conduit 46 or conduit 47. Conduit 46 comprises a rigid section 46a leading to a fitting 48, a flexible section 46b and a second rigid section 46c which leads into the pivoted end of cylinder 38. Conduit section 46c carries a one-way flow restrictor 49, which comprises a check valve 49a that opens freely and an adjustable restricting valve 49b arranged in parallel with the check valve. The device permits free flow into cylinder 38 while restricting the discharge flow therefrom. Conduit 47 comprises a rigid section 47a leading from valve 41 to fitting 48 and a flexible section 47b leading from said fitting to the crank end of cylinder 38.

Fluid pressure for actuating the spool member 42 of valve 41 is led to valve 41 through conduit 50 which is controlled by a three-way valve 51 actuated by solenoid T subject to controlling means which will later be described. When fluid pressure is applied to piston 43 of valve 41 the spool 42 is moved against the tension of spring 44 of said valve and when the piston chamber of the valve is opened to exhaust through valve 41 spring 44 moves the spool in the opposite direction.

The crank arm 36 of stand 23 (Fig. 3) carries a cam 53 having a follower 54 mounted on a lever 55 pivotally supported at its lower end and carrying contacts 56, 56 at its upper end arranged to actuate the arms of limit switches LS6 and LS7, these switches constituting part of the automatic control system of the apparatus which will later be described.

In the case of the hydraulic motor unit 37' of stand 24 (Fig. 4) the admission of pressure fluid to the motor is controlled by a four-way valve 57 which is of the same general character as valve 41 but is constructed and arranged to be actuated mechanically instead of hydraulically. Accordingly valve 57 comprises spool valve member 58, an actuating rod 59 and actuating spring 60 (Fig. 15). To move the valve spool 58 against the tension of spring 60 a cam 61 is mounted on crank arm 36' and has a follow roller 62 mounted on the lower end of a lever 63 which is pivoted at its upper end and carries a contact member 64 to actuate the valve rod 59 in one direction, while spring 60 serves to move the valve spool in the opposite direction. In most other respects valve 57, its fluid supply means and connections to its motor cylinder 38' are the same as in the case of the corresponding parts of stand 23 and comprise conduit sections 45', 46a', 46b', 47', 47a', 47b', 46c' and fitting 48'. No restrictor device is provided for motor unit 37'.

It will, of course, be understood that the inlet ports of valves 41, 51 and 57 are connected by suitable conduits with a source of liquid under pressure. Preferably the apparatus is fitted with a pump and accumulator unit (not shown) to serve as such source and afford pressure fluid for all hydraulic motors of the apparatus, while exhaust ports of the valves (or motors) are connected to the sump from which the pump draws liquid.

It has been pointed out above that the pipe lifting carriers 28 of the several stands 22, 23, 24, are driven in unison through the connections of gears 31, pinions 33 and shaft 34. It will now be apparent that the actuation of one of the gears 31 in each of the two stands 23 and 24 by means of the hydraulic units provides a common power drive for the pipe carriers. In a manner which will later be fully explained the hydraulic motor effects intermittent single rotation movements of the carriers.

We come now to consideration of the pipe-supporting means provided to support the pipe sections under treatment at several positions or stations which are in turn temporarily occupied by the pipe sections in the operation of the apparatus, there being five such stations in the case of the apparatus shown, which is designed for the threading of both ends of the pipe sections, and these stations correspond to the five notches in the carriers 28.

On the receiving sides of the stands 22, 23 are brackets 65 carrying inclined support rails 66 disposed at a height to receive pipe sections from skids 25 (Figs. 3, 4). The brackets 65 also afford pivotal support for stop levers 67 which project above rails 66 and serve to position a pipe section on the rails ready for transfer by the work-lifting carriers 28. Levers 67 are adjustably fixed in position by double-armed levers 68, 68 keyed on shaft 69 which is supported by the brackets 65. Each of the levers 68 carries opposing set screws 70, 70 to engage the lower ends of lever 67 and secure it in adjusted position in relation to the lever 68. One of the levers 68 is provided with a downward extension 68a (Fig. 3) which is adjustably secured in position by eye bolt and nut device 71. By adjusting the nuts of the securing device 71 all of the levers 68 can be moved to adjust the stop levers 67 in suitable position to accommodate pipe sections of different diameters so that the axis of the pipe section will always be in the same vertical plane regardless of the diameter of the pipe. The adjusting screws 70 provide angular adjustment of the individual levers 67 to insure alignment of the said levers with each other. Thus the rails 66, at points adjacent the stop levers 67, afford seats for a pipe section at the initial station of the apparatus.

Each of the three stands is also fitted with a pair of unitary power rollers 72, 72 each of which has its bearing support in a frame 73 and is driven by an electric motor 74 through worm and wheel gearing (not shown). The rollers 72 have V-grooved rims adapted to receive and support pipe sections of various diameters and the three pairs of rollers are aligned in two groups as shown in Fig. 1 and these two groups of rolls constitute pipe section support seats at two additional stations of the apparatus. The three driven rolls adjacent supporting rails 66 are driven in a direction to advance a pipe section resting on them toward threading machine 11, while the second set of power rolls are driven in the reverse direction so as to advance a pipe section resting on them toward the second threading machine 12.

Each of the three stands is also fitted with a pair of idle rollers 75, 75 having V-grooved rims to receive and support pipe sections. Each of the rolls 75 is carried on the upper end of a vertical rod 76 slidably supported between parallel ribs 77 of the stand structure, the six rollers of the three stands being aligned in two groups as shown in Fig. 1 so as to provide support seats for pipe sections in the two remaining stations of the apparatus. The lower bevelled end of each rod 76 rests upon a wedge member 78 and the corresponding wedges of the three stands are connected by rod means 79 so that connected wedges 78 of the three stands can be moved longitudinally of rods 79 in order to effect simultaneous vertical adjustment of rollers 75. A nut or turnbuckle 80 is interposed in each rod section between the wedge 78 of stand 23 and each of the wedges 78 of the two other stands 22 and 24 so that the three connected wedges can be adjusted in relation to each other to insure positioning of the three corresponding rollers 75 at the same height for supporting engagement with a pipe section.

Adjusting devices for simultaneously adjusting each set of three wedges is shown in Fig. 1a. Said devices comprise a lever 81 pivoted at its upper end on bracket arm 82 carried by the parallel ribs 77. Lever 81 is pivotally connected at its lower end to a clamp 83 on rod 79. The lever is also connected by a threaded link 84 with a hand wheel 85 supported as shown from ribs 77 in a manner permitting rotation of the wheel by holding it against axial movement. With the individual wedge member 78 properly adjusted by turnbuckle 80 to support rollers 75 at the same height, said rollers can be adjusted simultaneously to accommodate pipe sections of different diameters by rotation of hand wheel 85.

In Figs. 3–5 pipe sections are shown by dotted lines in the five positions in which the supporting means above described support them and these positions or stations are designated I, II, III, IV and V, respectively. As is indicated in Fig. 5, the notches of the carriers 28 are correspondingly arranged to engage the pipe sections at the five different stations. Thus when a single-rotation movement (in counter-clockwise direction, Fig. 5) of the transfer mechanism is carried out the carriers 28 engage pipe sections in the five stations, advancing each pipe section from one station to the next through circular paths indicated by dot-and-dash lines in Fig. 5.

The pipe supports afforded by the two sets of power rolls 72, 72 are supplemented by idle rolls 86 and 87 which are conveniently mounted on the bed frame of machine 11 and by idle roll 88 similarly mounted on bed frame of machine 12. A pipe stop device 89 is mounted on machine 11 in alignment with roller 86 and a similar stop 90 is mounted on machine 12 in alignment with roller 88. The two stops 89 and 90 otherwise are located laterally opposite the dies 15 of the machines 11 and 12, respectively, to secure predetermined positioning of the ends of the work pieces with respect to the transverse planes of the die cutters. These stops 89 and 90 carry actuators 91 and 92, respectively, of switches that constitute a part of the control system of the apparatus, in that said switches must be held in closed position by the endwise adjustment of the pipe sections to permit automatic starting of the transfer mechanism.

*Control system*

The automatic control of the entire apparatus is effected to a large extent by electrical devices indicated by the diagram shown in Fig. 18. In the diagram the left and right panels or sections show, respectively, the controls for the machines 11 and 12 while the central panel shows the controls of the transfer mechanism 13.

The symbols and terminology employed in Fig. 18 are conventional and the diagram will be understood without detailed description. It will be observed that the devices are connected across two lines, L1 and L3, of a three-phase supply system. Limit switches actuated automatically are designated by the letters LS. Other switches shown are manually operated. Control relays are designated by the letters CR. Solenoids, used chiefly to actuate the valves of fluid pressure motors (air or hydraulic), are designated by letters A, B, C, etc. A number of the solenoids and controls for machine 11 are duplicated for machine 12 and the latter controls are designated by the same letters as the former ones.

Operation

In describing the operation of the apparatus reference will be had especially to Figs. 7–13 and 18.

It may be assumed that, due to previous operation of the transfer mechanism, five pipes are in the apparatus, one at each of the five stations I, II, III, IV and V; that the parts of the transfer mechanism are at rest in the positions shown in Figs. 3, 4, 5 and 7 following one of the cyclical movements of the mechanism and that the two machines 11 and 12 have just completed their operating cycles with the opening of their pipe-gripping chucks. At this time the dies of the threading machines are collapsed, the pipe chucks are fully returned and relays CR1 are energized. Also switch LS6 is in closed (lowered) position.

The opening of the pipe chucks actuates the two limit switches LS8 and this energizes relay CRY and interlocking relay CRX, which in turn energizes solenoid T of transfer control valve 51. The energizing of solenoid T moves the control valve 51 to position four-way valve 41 so as to reverse the pressure in the control cylinder 38 existing at the stage indicated in Fig. 7 and thereby produce the condition indicated in Fig. 8 and start rotation of the transfer mechanism. The energizing of control relay CRY also closes a circuit which in turn energizes the two relays D which cause the resetting of the previously collapsed threading dies of machines 11 and 12.

After 2° or 3° rotation of the transfer mechanism the cam 53 associated with power cylinder 38 permits release (opening) of the normally open limit switch LS6 and thereupon control relay CR1 is deenergized. At the end of 5° rotation of the transfer mechanism, the pipe carriers 28 engage the pipe sections at stations III and V and start to lift them off their supporting rollers, the pipe at station I being similarly engaged after 10° rotation. A rotation of 45° (total) brings the parts to positions shown in Fig. 9 with the piston of cylinder 38' of stand 24 at dead center position and with its control valve 57 moved by its control cam 61 to reverse the pressure in cylinder 38'.

A rotation of the transfer mechanism 10° beyond the position of Fig. 9 brings the pipe carriers into engagement with the pipes at live roll stations II and IV, and continued rotation to 90° beyond the position of Fig. 9 brings the piston of cylinder 38 of stand 23 to dead center position and causes movement of cam roller 54 to open the normally closed switch LS7 which deenergizes relay CRY and solenoid T and reverses valve 51 to shift the four-way valve 41 to reverse the pressure in the cylinder 38 controlled thereby (Fig. 10).

The pressure in motor cylinder 38' of stand 24 carries the rotation of the transfer mechanism through the dead center position of the piston in cylinder 38 shown in Fig. 10. As the rotation is carried on from the latter position by pressure in both cylinders, and after a total rotation of 145°, the transfer mechanism deposits the pipe lifted from stations I and III upon the continuously driven live rollers at stations II and IV, and at approximately the same time, the pipe lifted from station V is delivered on the discharge skids 26. The two pipes deposited upon the live rollers at stations II and IV, immediately upon contacting the rollers, are moved endwise in opposite directions toward pipe stops 89 and 90, respectively, to effect their endwise positioning preparatory to the next following actuation of the transfer mechanism. This endwise positioning operation proceeds while the transfer mechanism is continuing its movement. When the rotation has continued for another 50° (total rotation of 195°) the pipes removed from stations II and IV, and which had previously been precisely positioned endwise in relation to the transverse planes of the respective cutters of the two machines, are deposited at stations III and V within the open chucks of the two threading machines in position for engagement with the cutters after a minimum slow feed movement.

Further 30° rotation of the transfer mechanism brings the hydraulic motor units to the positions shown in Fig. 11. Here the piston of cylinder 38 is at midstroke and the follow roller 54 of the switch-operating cam 53 has just been moved to release the switch LS7 to its normally closed position and close switch LS9 to start the operation of machines 11 and 12. At this point, movement of the control cam of cylinder 38' has permitted shifting of valve 57 as the piston of this cylinder reaches dead center position in order to reverse the cylinder pressures.

With continued turning of the transfer mechanism from the Fig. 11 position, the piston of cylinder 38 reaches dead center as shown in Fig. 12, but control valve 41 is not shifted and the hydraulic pressure in cylinder 38 thus is brought into opposition to that in cylinder 38' as the piston in the former cylinder reverses its direction. This condition continues in Fig. 13. However, at this time the leverage of the piston in cylinder 38', while less than at the Fig. 12 position, still exceeds that of the piston of cylinder 38 so that the turning of the transfer mechanism is continued, with the leverages of the two cylinders approaching equality. When the parts reach the positions shown in Fig. 7, the pressures exerted by the pistons of the two cylinders 38 and 38' are equal and opposite and the transfer mechanism is brought to rest in its starting position smoothly and without shock, a substantial contribution to this result being supplied by the timing of the hydraulic motor controlling valves so that they bring the carriers to a stop during their rising movement and the action of gravity assists the motor units in overcoming the momentum of the driven parts.

Meanwhile the closing of switch LS9 at the point indicated in Fig. 11, has served to energize solenoids B1 which actuate control valves of the chuck operating motors and thereby initiate operation of machines 11 and 12 which proceeds while the transfer mechanism is completing its cycle through the positions in Figs. 12, 13 and 7. Tracing the operation of the threading machines, the pipe chucks in closing, in turn actuate limit switches LS5 to energize solenoids A1 which actuate control valves to start rapid traverse of the chucks toward the machine dies. At the end of the rapid traverse of the chucks, limit switches LS2 close downward and thereby deenergize solenoids A1 of the rapid traverse control valves. At the same time solenoids C, which actuate valves controlling clutches to initiate slow feed of the work, are energized to start accurate slow feed as the pipe is about to engage the thread cutting chasers of the dies. After the thread has been cut and at the collapse of the thread-cutting chasers, limit switches LS4 are closed. Since pipes are in place in the pipe chucks, cam 53 has stopped in position to move and hold limit switch LS6 down. A circuit is then completed from line L1 through upper contacts of switch LS6 to upper contacts of control relay CR2 (normally closed), thence through upper contacts of limit switch LS4 to lower contacts of limit switch LS9, thence to coil of CR1, raising its armature to close its upper and lower contacts. The lower contacts form a holding circuit to maintain the energization of coil CR1. The opening of the lower contacts of limit switch LS4 deenergizes solenoid B1 and solenoid C, thus starting the disengagement of the feed drive clutches and releasing pilot pressure on a four-way hydraulic valve controlling the pipe chucks. The disengagement of the feed drive clutches operates limit switches LS9 which energizes solenoids A2 and that in turn causes rapid retraction of the pipe chucks. It will be seen that with relay CR1 energized and its lower contact closed, the lines on the right side of switch LS9 are connected to the current source through switch LS4, upper contacts of relay CR2 and switch LS6, the switches LS4 and LS6 being at this time in lowered position and relay CR2 being always in lowered position when the apparatus is operating under automatic control.

Toward the end of the rapid retraction of the pipe chucks the latter close limit switches LS1 to energize solenoids B2 and thereby open the pipe-gripping chucks. This opening of the chucks completes the cycle of operation and signals the start of the next cycle, as noted in the outset of the description of the operation. Following the collapse of the chasers, time is afforded during the early part of the transfer mechanism rotation for the re-setting of the chasers.

If during automatic operation of the apparatus the "selector" switch of either or both of the machines 11 and 12 is thrown into "hold" or "hand" positions, the machines will complete the automatic cycle in progress and then change to the "hold" or "hand" condition, whichever was selected. If either chuck has failed to open and the transfer mechanism has started (at which time switches LS6 and LS8 would be raised) or if the operator detects trouble and presses the "emergency stop" button, control relay CR2 is energized which in turn energizes solenoid E, thus holding the transfer mechanism against further movement. After the offending chuck is opened, the solenoid E may be deenergized to release the mechanism by pressing the "re-set" button.

By leaving the selector switch of either threading machine on "hand" position and allowing the machine to complete its cycle the following operations may be performed by pressing push buttons:

1. Transferring pipe (the other machine, if left on "automatic," will proceed to thread the pipe transferred into its chuck).
2. Set the die.
3. Close the pipe chuck.
4. Open the pipe chuck.

At any time after setting the die and closing the chuck, if the selector switch is turned to "hold" the machine will complete the threading cycle as if the selector switch were in "automatic" position, but the transfer mechanism will be prevented from moving.

The foregoing description applies to the operation of thread forming. Other cutting operations, such for example as end-facing, may consume considerably less time than thread forming. In such cases the operating cycle will differ accordingly and it will be understood that the control device may be modified to fit the needs of different operations as to timing the movements of various parts of the apparatus.

An important feature of the above-described operation is the short over-all time required for the operating cycle of the apparatus, as a result of the character of the means employed to transfer the work pieces laterally from station to station. The form of the carriers 28 with depressed seats for the work pieces, their arrangement so as to serve all stations of the supporting means, the mounting of the carriers for movement in an endless closed path, all contribute to the minimizing of the working cycle of the apparatus. Thus the mounting and arrangement of the carriers adjacent the several stations of the apparatus for movement in an endless closed path, preferably circular, makes it possible to carry out the several functions of the apparatus simultaneously, or in overlapping relation, with corresponding shortening of the overall time of the cycle. The advantage in question is graphically shown by the chart of Fig. 17. This chart shows that during the first part of the pipe transfer movement the pipe previously deposited in station II (or IV), starts its endwise positioning movement, that this endwise positioning movement continues in the remainder of the rotation of the transfer mechanism and that soon after the start of the endwise positioning movement of the pipe in station II (or IV), and long before the end of the transfer movement, the pipe in station III (or V) is entering the threading machine cycle. The starting of the cutting operation long before the end of the movement of the transfer mechanism may easily reduce the length of the entire cycle by 15%, even in the case of the threading operation illustrated in Fig. 17; and in the case of shorter cutting operations, such as end facing, the reduction of the length of the entire cycle may rise to a very high percentage. The starting of the endwise positioning movement early in the transfer movement is of the highest importance when, with two cutting machines operating on both ends of pipe sections, apparatus constructed to handle full length sections is required to work short sections. The latter work necessitates a long endwise shift of the work piece delivered from the first cutting machine to position it for the second machine. This, with prior machines, may be a critical conditioning factor in the case of short time cutting operations.

Again the closed path movement of the carriers and their depressed seats for the pipe sections make it possible to effect transfer movement of the pipes with a high degree of precision and with complete freedom from any free rolling movement or endwise displacement of the pipes during the transfer. This is important in several respects. First, it insures a more accurate endwise positioning of the work piece in the chuck of the cutting machine because pipe sections are not perfectly straight and if they are permitted to roll or slide on supporting skids their endwise position may change substantially. Under these conditions, although the pipe may be properly positioned endwise before it is transferred laterally to the chuck station, it is necessary to make allowance for possible endwise movement due to rolling or sliding during the transfer by providing a longer feed movement of the cutting machine. This correspondingly lengthens the time of the cutting operation, and such increase, especially in the case of short cutting operations, may be very large percentagewise. In the second place, since the work pieces are constrained to move at all times in unison with the carriers and in definite paths, the time allowed for the transfer from station to station can be strictly limited to that needed for the movement of the carriers without any allowance for possible free or variable movement of the work pieces. Again, since the pipe seats of the carriers adequately secure the pipe sections in fixed relation to the carriers during the transfer movements, a relatively high speed movement of the carriers is possible. Finally, the fact that the transfer carriers move always in the same direction, with but one start and one stop in each cycle, contributes to smoothness of operation.

The aggregate contribution of the foregoing features to rapidity of operation is large and it is believed that the resulting output capacity of the improved apparatus is far greater than that of any comparable apparatus heretofore known.

It is to be noted further that the form of transfer devices employed makes possible a unitary transfer mechanism capable of serving a plurality of cutting machines operating on the two ends of the work pieces and of effecting all handling movement of the work pieces in synchronism and under complete automatic control. Obviously such a unitary transfer mechanism serving two or more cutting machines favors compactness of the apparatus and reduction of floor space required.

While the apparatus shown and described is of a preferred form it will be understood that use may be made of equivalent forms of various features of the apparatus, such as the single rotation means of the transfer mechanism, the control means, etc.

It is apparent that the control means will vary with the nature of the treating machine or machines served by the transfer mechanism. Thus, in the case of a machine for facing or tapering the pipe ends preparatory to threading by another machine, the control system will be simpler than for the threading machine because of the simpler sequence of movements in the case of the facing machine. So, too, if only one end of a work piece is treated the control system of Fig. 18 will be correspondingly simplified.

It should be understood also that the work transfer mechanism is applicable to various types of treatment and to various kinds of work pieces and that the supporting structure and the carrier means of the transfer mechanism can be extended to provide the required number of stations to serve varying numbers of operations or operating machines. Also it will be apparent that the hydraulic single rotation motor mechanism is itself susceptible of various applications. The said motor mechanism itself is not claimed herein as it is the subject of claims in our divisional application Serial No. 251,682, filed October 17, 1951.

What is claimed is:

1. In power actuated automatically controlled apparatus for handling and operating upon elongated work pieces, the combination of power driven machining means comprising cutting mechanism and work-holding chuck mechanism one of which mechanisms is mounted for feeding and retraction movements parallel to their common working axis, the chuck mechanism having movable opposing gripper jaws and, when said jaws are retracted, being open to permit entry between or discharge from the jaws of a work piece by lateral movement of the piece, and means operatively connected with one of the cutting and chuck mechanisms for effecting its feeding and retraction movements; work-handling means arranged adjacent the machining means and comprising supporting means having seats for the work pieces arranged in a plurality of groups with the seats of each group aligned parallel to the said axis of the cutting mechanism and the said groups forming a plurality of fixed work piece stations spaced apart transversely of the said axis and one of them coinciding with the chuck axis, power means at another of the stations in advance of the cutting mechanism station constructed and arranged to effect endwise adjustment of a work piece, a stop arranged in predetermined relation to the cutting mechanism and in line with the work seats of the power means station to limit endwise movement of a work piece by the said power means and position the piece endwise in relation to the machining means, and mechanism for lateral transfer of work pieces comprising a plurality of interconnected carriers having depressed work piece seats aligned in groups parallel to the axis of the cutting mechanism and corresponding to the stations of the supporting means, the carriers being mounted adjacent the supporting means for movement in unison in endless closed paths to engage the carrier seats with work pieces in the support stations, lift said pieces off the supporting means and transfer them laterally, free of rotational movement about their axes and of longitudinal displacement, to the next following stations, whereby work pieces so transferred from the endwise-adjustment station to the chuck station are positioned for machining in accurate predetermined relation to the cutting mechanism; motor means for moving the carriers intermittently; and control means for effecting operations of the work transfer carriers, endwise adjustment means, chuck mechanism and cutting mechanism in timed relation to each other.

2. Apparatus as claimed in claim 1 in which the control means comprise devices operating in timed relation to the chuck mechanism for intermittently starting and stopping the movement of the motor driven carriers to cause one complete traverse of the endless closed paths of the carriers on each actuation thereof.

3. In apparatus for handling work pieces and treating the ends thereof, the combination of power actuated means comprising cutting and chuck mechanisms one of which is mounted for feeding and retraction movements parallel to their common working axis, the chuck mechanism having reciprocable opposing gripper jaws and, when the jaws are retracted, being upwardly open to receive or discharge a work piece workhandling mechanism comprising supporting means having a plurality of groups of seats for the work pieces with the seats of each group aligned parallel to the axis of the cutting and chuck mechanisms and constituting a plurality of fixed stations to be occupied successively by the work pieces handled, one of said stations coinciding with the working axis of the chuck mechanism, power actuated means at the station immediately in advance of the chuck station for effecting endwise adjustment of the work pieces in relation to the cutting mechanism, power actuated work carrier means disposed adjacent the supporting means and formed with a plurality of groups of realigned work seats corresponding to the groups of seats of the supporting means and mounted for intermittent movement in unison in which the work seats of each group thereof on each actuation of the carrier means traverse endless closed paths in planes at right angles to the working axis of the cutting and chuck mechanisms and in such movement advance from one station to the next adjacent station and thereafter return to the starting point; and automatic control means for effecting relatively timed operations of the work carrier means, endwise adjustment means, chuck mechanism and cutting mechanism including closure of the chuck mechanism and starting of the cutting mechanism at the beginning of the return movement of the carrier means, with resultant shortening of the working cycle of the apparatus.

4. Apparatus as claimed in claim 3 in which the endwise adjustment station of the work supporting means is positioned in the path of the carrier movement a considerable distance in advance of the chuck station, whereby endwise adjustment of the work pieces can be initiated early in the working cycle of the apparatus.

5. In apparatus for handling and treating the ends of elongated work pieces, the combination of a plurality of power-actuated cutting machines disposed with their working axes parallel and being spaced apart to engage successively the two end parts of the work pieces; work handling mechanism comprising supporting means for the work pieces disposed adjacent the cutting machines, said supporting means having a plurality of groups of seats for work pieces with the seats of each group aligned parallel to the axes of the cutting machines and the said groups of seats constituting fixed stations to be occupied successively by the work pieces handled and certain of the stations coinciding with the axes of the cutting machines, means at stations in advance of the respective cutting machine stations for effecting endwise adjustment of the work pieces in relation to the said cutting machines, and power-actuated carrier means formed with a plurality of groups of work seats corresponding to the groups of seats of the supporting means and mounted for intermittent movements in unison in each of which each carrier seat follows an endless closed path from one station to another following station and back to its starting point and in which each of the groups of carrier seats lifts a work piece from one station and deposits it in a following station; and automatic control means for effecting relatively timed operations of the work-handling mechanism and the cutting machines.

6. In apparatus for handling and treating the ends of elongated work pieces, the combination of a pair of power-actuated cutting machines disposed with their working axes parallel and being spaced apart to engage the two ends of the work pieces in succession; work handling mechanism comprising supporting means for the work pieces disposed between and adjacent to the cutting machines, said supporting means having five groups of seats for work pieces with the seats of each group aligned parallel to the axes of the cutting machines and the said groups of seats constituting five fixed stations to be occupied successively by the work pieces handled with the third and fifth stations, respectively, coinciding with the axes of the two cutting machines, means at the second and fourth stations for effecting endwise adjustment of the work pieces in relation, respectively, to the cutting machines at the third and fifth stations, and power-actuated carrier means formed with five groups of work seats corresponding to the five groups of seats of the supporting means and mounted for intermittent movement in unison in which each carrier seat follows an endless closed path from one station to a following station and back to its starting point and in which each of the five groups of carrier seats lifts a work piece from one station and deposits it in a following station; and automatic control means for effecting relatively timed operations of the work carrier means and the cutting machines.

7. Apparatus as claimed in claim 1 having automatic electric means for controlling movement of the transfer carriers comprising a limit switch operatively associated with the stop that effects endwise positioning of the work pieces and which must be actuated by the endwise movement of a work piece as a condition to the actuation of the transfer mechanism.

8. In apparatus for handling and treating the ends of work pieces, the combination of a power actuated collapsible-chaser threading machine comprising a power actuated work-holding chuck; a power actuated intermittently operated transfer mechanism constructed and arranged to feed work pieces to the chuck of the threading machine and discharge them therefrom; and electric control means for the apparatus constructed and arranged to effect the automatic synchronized operation of the threading machine and transfer mechanism, the control means comprising a manual multiple position selector switch which in one position conditions the control means to effect continuous automatic operation of the entire apparatus and in a second position conditions the control means to stop the automatic operation of the apparatus at the end of the operating cycle of the threading machine in progress when the switch is moved from the first named position to the second position.

9. Apparatus as claimed in claim 8 in which the electric control means comprises an additional switch manually operable when the selector switch is in its second position, to cause operation of the transfer mechanism only.

10. Apparatus as claimed in claim 8 in which the electric control means comprises an additional switch manually operable when the selector switch is in its second position, to apply power for resetting the chasers of the threading machine.

11. Apparatus as claimed in claim 8 in which the electric control means comprises an additional switch manually operable when the selector switch is in its second position, to apply power for closing the chuck of the threading machine.

12. Apparatus as claimed in claim 8 in which the electric control means comprises an additional switch manually operable when the selector switch is in its second position, to apply power for opening the chuck of the threading machine.

13. In power-actuated apparatus for handling elongated work pieces, the combination of a plurality of separate supporting structures; a plurality of cranks mounted on each of the supporting structures with the arms of all of the cranks mutually in phase and with the cranks of the respective supporting structures disposed to turn in upright parallel planes; a work piece carrier mounted on the crank pins of each supporting structure to move in parallelism when the cranks are turned in unison; power means for driving the carriers comprising a fluid pressure, double-acting, reciprocating-piston motor unit and a crank driven thereby mounted on each of two of the supporting structures with the two motor unit cranks in out-of-phase relation and operatively connected to turn in unison, the interconnected cranks and the motor units connected to them being constructed and arranged for full circular rotation of each crank in one direction; and valve means controlling admission and exhaust of working fluid to and from the motor cylinders.

14. In power-actuated automatically controlled apparatus for handling elongated work pieces, the combination of work piece supporting means having seats for the work pieces arranged in a plurality of separate groups with the seats of each group mutually aligned and laterally opposite, respectively, to corresponding seats of the other group or groups to form a plurality of fixed work piece stations spaced laterally from each other; work transfer means comprising a plurality of elongated carriers arranged transversely of the groups of work seats and each formed with depressed seats corresponding to the fixed stations of the supporting means, and a plurality of parallel cranks supporting each of the carriers for movement in parallelism in circular paths extending partly above and partly below the level of the fixed seats of the supporting means; and power means for driving the carriers comprising a pair of power cranks connected and supported to turn in unison and having their crank pins disposed with a substantial minimum angular displacement from each other less than 180°, a pair of reciprocating hydraulic motor units each of which has a cylinder part and a piston part with the reciprocating parts of the two motor units operatively connected respectively to the said crank pins, the interconnected power cranks and the motor units connected to them being constructed and arranged for full circular rotation of each crank in one direction, valve devices constructed and arranged to admit and exhaust working fluid to and from the motor cylinders, and valve operating means actuated in timed relation with the rotation of the cranks to admit working fluid to the two motor units and cause application of their torques to the connected cranks additively during a portion of each rotation of the cranks to effect their rotation and, oppositely, in another part of each rotation in which the crank pins and the carriers mounted thereon are rising and the leverages of the two motor units approach and attain equality and thereby stop the rotation.

15. Apparatus as claimed in claim 14 in which the motor means for driving the carriers have their power cranks disposed with an angular displacement from each other of approximately 90°.

References Cited in the file of this patent

UNITED STATES PATENTS

| Number | Name | Date |
| --- | --- | --- |
| 324,222 | Campbell | Aug. 11, 1885 |
| 1,160,938 | Mitchell | Nov. 16, 1915 |
| 1,486,924 | McKee | Mar. 18, 1924 |
| 1,529,017 | Dyblie | Mar. 10, 1925 |
| 1,659,848 | Wilson | Feb. 21, 1928 |
| 1,800,779 | Clark | Apr. 14, 1931 |
| 1,931,405 | Dahlstrom | Oct. 17, 1933 |
| 1,965,868 | Vickers | July 10, 1934 |
| 1,975,369 | Morrison | Oct. 2, 1934 |
| 1,975,370 | Morrison | Oct. 2, 1934 |
| 2,141,470 | Harry | Dec. 27, 1938 |
| 2,210,531 | Engelbaugh | Aug. 6, 1940 |
| 2,405,141 | Hibbard | Aug. 6, 1946 |